United States Patent

Finch et al.

[15] 3,676,858

[45] July 11, 1972

[54] METHOD, APPARATUS AND COMPUTER PROGRAM FOR DETERMINING THE TRANSMISSION RATE AND CODING CONFIGURATION OF REMOTE TERMINALS

[72] Inventors: De Ver C. Finch; James A. Kennedy, both of Phoenix, Ariz.

[73] Assignee: Honeywell Information Systems Inc.

[22] Filed: Sept. 30, 1970

[21] Appl. No.: 76,726

[52] U.S. Cl. ................................................340/172.5, 444/1

[51] Int. Cl. ............................................................G06f 3/00

[58] Field of Search ...............................................340/172.5

[56] References Cited

UNITED STATES PATENTS

| | | | |
|---|---|---|---|
| 3,311,886 | 3/1967 | Herman et al. | 340/172.5 |
| 3,390,379 | 6/1968 | Carlson et al. | 340/172.5 |
| 3,510,843 | 5/1970 | Bennett et al. | 340/172.5 |
| 3,569,943 | 3/1971 | Mackie et al. | 340/172.5 |

*Primary Examiner*—Raulfe B. Zache

*Attorney*—Edward W. Hughes and Fred Jacob

[57] ABSTRACT

A method, an apparatus, and a computer program are disclosed for determining the transmission rate and coding configuration which characterize dissimilar remote terminals in a time-shared computer system. Electrical communication is established between an individual remote terminal and a line adapter unit, a single standard character is then transmitted from the remote terminal to the line adapter unit. The standard character is immediately analyzed either by hardware or by software to determine which one of a variety of transmission rates and code configurations characterize the particular terminal. In response to the analysis of the standard character, data communication is established between the remote terminal and the computer at the indicated transmission rate and in the indicated code.

10 Claims, 15 Drawing Figures

HARDWARE EMBODIMENT

Patented July 11, 1972

3,676,858

12 Sheets-Sheet 1

INVENTOR.
DE VER C. FINCH
JAMES A. KENNEDY
BY Samuel J. Sutton, Jr.
ATTORNEY

TABLE A

| 1 | 2 | | | | | | | | 3 | 4 | | | | | | | | 5 |
|---|---|---|---|---|---|---|---|---|---|---|---|---|---|---|---|---|---|---|
| CR CHARACTER CONFIGURATION | BINARY VALUE OF FIRST CHARACTER | | | | | | | | OCTAL VALUE(S) OF FIRST CHARACTER | BINARY VALUE OF SECOND CHARACTER | | | | | | | | OCTAL VALUE(S) OF SECOND CHARACTER |
| | 8 | 7 | 6 | 5 | 4 | 3 | 2 | 1 | | 8 | 7 | 6 | 5 | 4 | 3 | 2 | 1 | |
| ASCII/300 | 1 | 0 | 0 | 0 | 1 | 1 | 0 | 1 | =215 | NOT SAMPLED | | | | | | | | NONE |
| ASCII/150 | 1 | 1 | X | 0 | X | 1 | 1 | 0 | =306+316+346+356 | 1 | 1 | 1 | 0 | 0 | 0 | 0 | 0 | =340 |
| IBM/135 | 1 | 1 | X | 0 | X | 1 | 1 | 0 | =306+316+346+356 | 1 | 1 | 1 | 1 | 1 | 1 | 1 | 0 | =376 |
| ASCII/110 | 1 | 0 | 0 | X | 1 | 1 | X | 0 | =214+216+234+236 | X | 0 | 0 | 0 | 0 | 0 | 0 | 0 | =200+000 |
| BAUDOT/75 | 0 | 0 | 0 | 0 | 0 | 0 | 0 | 0 | =000 | 1 | 1 | 1 | 1 | 1 | 0 | 0 | 0 | =370 |

FIG. 5

CONTROL LOGIC UNIT

CHARACTER DECODE UNIT

METHOD, APPARATUS AND COMPUTER PROGRAM FOR DETERMINING THE TRANSMISSION RATE AND CODING CONFIGURATION OF REMOTE TERMINALS

BACKGROUND OF THE INVENTION

This invention relates to time-shared data communication systems, and more particularly, to time-shared data communication systems including plural remote terminals which exchange data with the central computer at various rates and in a variety of codes.

Because today's computers are capable of operating at rates many times higher than the rates at which individual users are able to supply and accept data, the concept of time sharing a single computer between a large number of users is finding wider and wider application. In making a single computer simultaneously available to a large number of users, it is possible, through an appropriate allocation of computer time, to utilize the computer on a virtually continuous basis and thereby spread the associated operating expenses over a larger economic segment.

A significant problem which has long been encountered by time sharing services, arises from the fact that the various users of the service tie into the central system with many different types of remote input/output terminals. These terminals transmit and receive data at a number of different bit rates and are configured to handle data in a number of different codes. The most common data transmission rates presently in use are 300, 150, 135, 110 and 75 bits per second (baud). The three most commonly encountered binary coding schemes are ASCII, IBM, and BAUDOT. Information in the ASCII code is generally transmitted at either 300, 150 or 110 baud, while IBM coded information is generally transmitted at 135 baud. Data transmitted in the BAUDOT code is at the maximum rate of 75 baud. In the BAUDOT, IBM and ASCII codes, individual data characters contain 5, 7 and 8 bits per character, respectively.

It is clear that, in order to provide competitive service, time sharing must be capable of connecting to all or any combination of the commercially available terminals, regardless of the rate at which they transmit and receive data and regardless of the code in which they communicate.

In the past, it has been necessary for the time sharing service to assign unique telephone numbers for customers to call depending upon the particular code and bit rate which characterized the customer's remote terminal. Thus, for example, all users of ASCII/300 terminals would be assigned one number while users of IBM/135 terminals would be assigned another number. Each group of terminals having common code configurations and common bit rates were by this technique associated with separate communications adaptors capable of interfacing the particular terminals with the central computer. Because it is impossible to predict how many terminals of each configuration will be tied into the time sharing system, it is difficult to achieve a proper balance between the number and type of communications adapters required to facilitate the various types of terminals on a dynamic basis.

Certain improved prior art systems, such as the one disclosed in a co-pending application by Kennedy, et al, entitled "DATA COMMUNICATION SYSTEM", now U.S. Pat. No. 3,618,031 assigned to the assignee of the present invention, employ communications adapters which are capable of being automatically configured to receive variously encoded data. Such automatic configuration may be accomplished either by hardware or by a program executed in the central computer. While this type of communications adapter provides the means for dynamically balancing data processing tasks in different codes between available data channels, existing methods for initially identifying the exact configuration of each remote terminal are inadequate.

One prior art method for initially determining the code and bit rate for which a remote terminal is configured is based upon the sequential transmission of the standard character WRU ("WHO ARE YOU") from the central computer to the remote terminal at a variety of bit rates and in a variety of codes. When the WRU character is sent in the proper code and at the proper transmission rate, it is recognized by the remote terminal. Thereafter, a message (or identification number) indicating that a meaningful WRU character has been received is transmitted automatically by means of an answerback drum, to the central computer. The computer interprets the message transmitted from the remote terminal as meaning that the particular terminal is configured in the code and at the bit rate which characterized the last WRU character sent to the remote terminal.

While this method of determining terminal configuration is operative, it typically consumes an excessive amount of time. Consider, for example, a system wherein remote terminals may be configured as either ASCII/300, ASCII/150, IBM/135, ASCII/110 or BAUDOT/75. To establish data communications with a terminal configured in ASCII/110, the computer first must transmit a WRU character in ASCII/300 and wait a prescribed period of time (on the order of seconds) for the return of a message indicating that the remote terminal has recognized the WRU. Since the ASCII/110 terminal will not recognize the ASCII/300 WRU character, no reply is transmitted and the computer must further interrogate the terminal by sending a WRU character in ASCII/150. After waiting the prescribed period of time without having received a response, the computer then sends a WRU character in IBM/135 and again receives no response. Finally, upon transmission of an ASCII/110 WRU character, the computer receives a message from the terminal indicating that the WRU character was recognized, that the terminal is configured for ASCII/110, and that data transmission may be initiated through an appropriately configured data channel. As can be seen from this example, in many cases data communication between the remote terminal and the central computer will be established only after the expenditure of a considerable amount of time. This prior art method is further disadvantageous in that meaningless characters are printed out as the remote terminal undergoes interrogation. Furthermore, this method is practical only where all of the terminals in the system are equipped with answerback drums.

OBJECTS OF THE INVENTION

It is an object of this invention to provide a method apparatus and computer program for identifying the code and transmission rate which characterizes the various remote terminals in a time shared computer system and to achieve such identification in an extremely short period of time.

Another object of this invention is to provide a method for identifying the code and bit rate configuration of remote terminals, which method may be simply and inexpensively executed either by hardware or by a computer program; and to provide such hardware and such computer program.

A further object of this invention is to provide a method for identifying the configuration of remote terminals, which method is adaptable to any combination of commercially used codes and transmission rates and which method may be implemented without the necessity of structurally modifying any of the remote terminals.

SUMMARY OF THE INVENTION

Briefly stated, and in accord with one embodiment of the invention, a line adapter unit is provided for receiving and immediately decoding a single standard character sent from a remote terminal in the code and at the transmission rate for which the terminal is configured. A unique decode signal is generated which indicates to the line adapter unit in which one of a plurality of code-bit-rate combinations the standard character was transmitted. In response to the recognition of the unique decode signal, the line adapter unit generates a signal indicative of the remote terminal's configuration, thereby allowing for the establishment of data communication between the remote terminal and the central computer through an appropriately configured data channel.

DESCRIPTION OF THE DRAWING

The invention is pointed out with particularity in the appended claims. However, other objects and advantages, together with the operation of the invention, may be better understood by reference to the following detailed description taken in connection with the following illustrations wherein:

FIG. 5 is a decode chart showing the binary and octal values associated with a CR character transmitted in the various code-bit-rate combinations illustrated in the timing diagram of FIG. 4.

DETAILED DESCRIPTION OF THE INVENTION

In order to better illustrate the advantages of the invention and its contributions to the art, a preferred hardware embodiment and a preferred software embodiment of the invention will now be described in some detail.

OVERALL OPERATION

Figure 1:
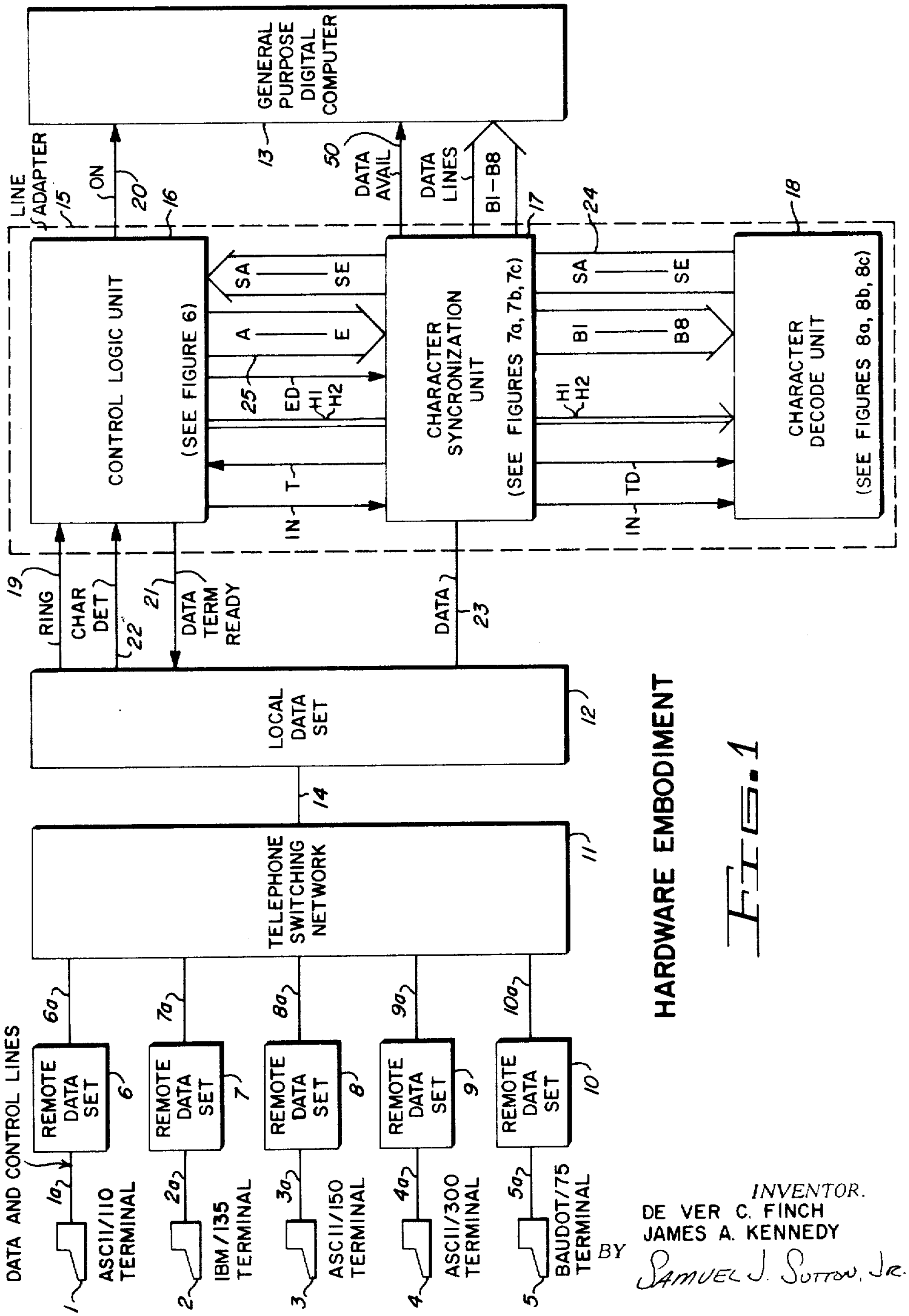
FIG. 1 is a generalized block diagram showing a hardware embodiment of the invention in a time-shared computer system.

The overall operation of the invention in time-shared computer environment will be first described with reference to FIG. 1. In FIG. 1, a plurality of variously encoded Remote Terminals 1 through 5, in this case teletype devices, are connected through data and control lines 1*a* through 5*a* to Remote Data Sets 6 through 10. Each of the Remote Data Sets are connected through individual telephone lines 6*a* through 10*a* to Telephone Switching Network 11. Telephone Switching Network 11 is in communication with a Local Data Set 12, located at the site of the General Purpose Digital Computer 13, via telephone line 14. It is assumed, for purposes of discussion, that remote terminals 1 through 5 are configured respectively in the following code-bit-rate combinations: ASCII/110, IBM/135, ASCII/150, ASCII/300 and BAUDOT/75.

The structure and operation of Remote Data Sets 6 through 10 and Local Data Set 12, in cooperation with Telephone Switching Network 11, are well known in the art and accordingly will not be discussed in detail.

Line Adapter 15 is interposed between Local Data Set 12 and Computer 13 and is made up of three basic functional units; viz., Control Logic Unit 16, Character Synchronization Unit 17 and Character Decode Unit 18.

When a remote user wishes to access Computer 13, it is necessary first to establish electrical communication between the particular Remote Terminal and Line Adapter 15, and then to determine the configuration of the Remote Terminal so that meaningful data communication may be established between the Remote Terminal and Computer 13. To establish electrical communication an operator using, for example, ASCII/150 terminal 3, places a call to Local Data Set 12, the call is routed through Remote Data Set 8, Telephone Switching Network 11 and the interconnecting lines 3*a*, 8*a* and 14. When Local Data Set 12 receives a RING signal from Remote Terminal 3, line 19 to Control Logic Unit 15 changes from a binary ZERO state to a binary ONE state. In response to this change in condition, Control Logic Unit 16 switches line 20 to a binary ONE (signal ON) state, indicating to Computer 13 that a call is being received from a Remote Terminal and Line Adapter 15. At the same time that the ON signal appears on line 20, so does the DATA TERM READY signal on line 21. The DATA TERM READY signal indicates to Local Data Set 12 that it should answer the call from Remote Terminal 3. When electrical communication has been successfully established between Remote Terminal 3 and Local Data Set 12, line 22 is switched from a binary ZERO to a binary ONE (signal CHAR DET). The appearance of the signal CHAR DET serves to initialize the various units which make up Line Adapter 15.

The occurrence of an appropriate indicator at Remote Terminal 3 indicates that electrical communication has been established with Line Adapter 15. In many cases, this indicator is the presence of an audio tone at the Remote Terminal. The presence of the audio tone indicates to the operator that electrical communication has been established and that he may proceed to transmit information to the central system.

Because the operator must first assure himself that the carriage of his teletype is in its initial (extreme right) position, he pushes the CARRIAGE RETURN (CR) key. In those cases where the teletype happens to have an answerback drum, the operator may press the appropriate key and the answerback drum will automatically transmit a CR character followed by a series of characters identifying the Remote Terminal as a valid user. In either case, the first character transmitted from the Remote Terminal is a CR character which is received at Local Data Set 12 and sent therefrom as DATA over line 23 to Character Synchronization Unit 17. The CR character is temporarily buffered in the Character Synchronization Unit 17 while examined by Character Decode Unit 18 which determines the code-bit-rate configuration of the particular CR character. In response to this determination, Character Decode Unit 18 transmits, over one of lines SA through SE in Cable 24, an appropriate indication to the Control Logic Unit 16. Control Logic Unit 16 then issues an appropriate signal A through E over Cable 25. Character Synchronization Unit 17 receives this signal from Control Logic Unit 16 and is automatically configured to properly synchronize all subsequently arriving data from Remote Terminal 3 for transmission over Data Lines B1 through B8 to Computer 13.

Decoding the Standard Character

The invention process of code-bit-rate determination described herein is based upon the sampling of an initial standard character (CR) at a sampling rate equal to the highest transmission rate in the time-shared system; and analyzing the bit patterns thus generated.

Figure 4:
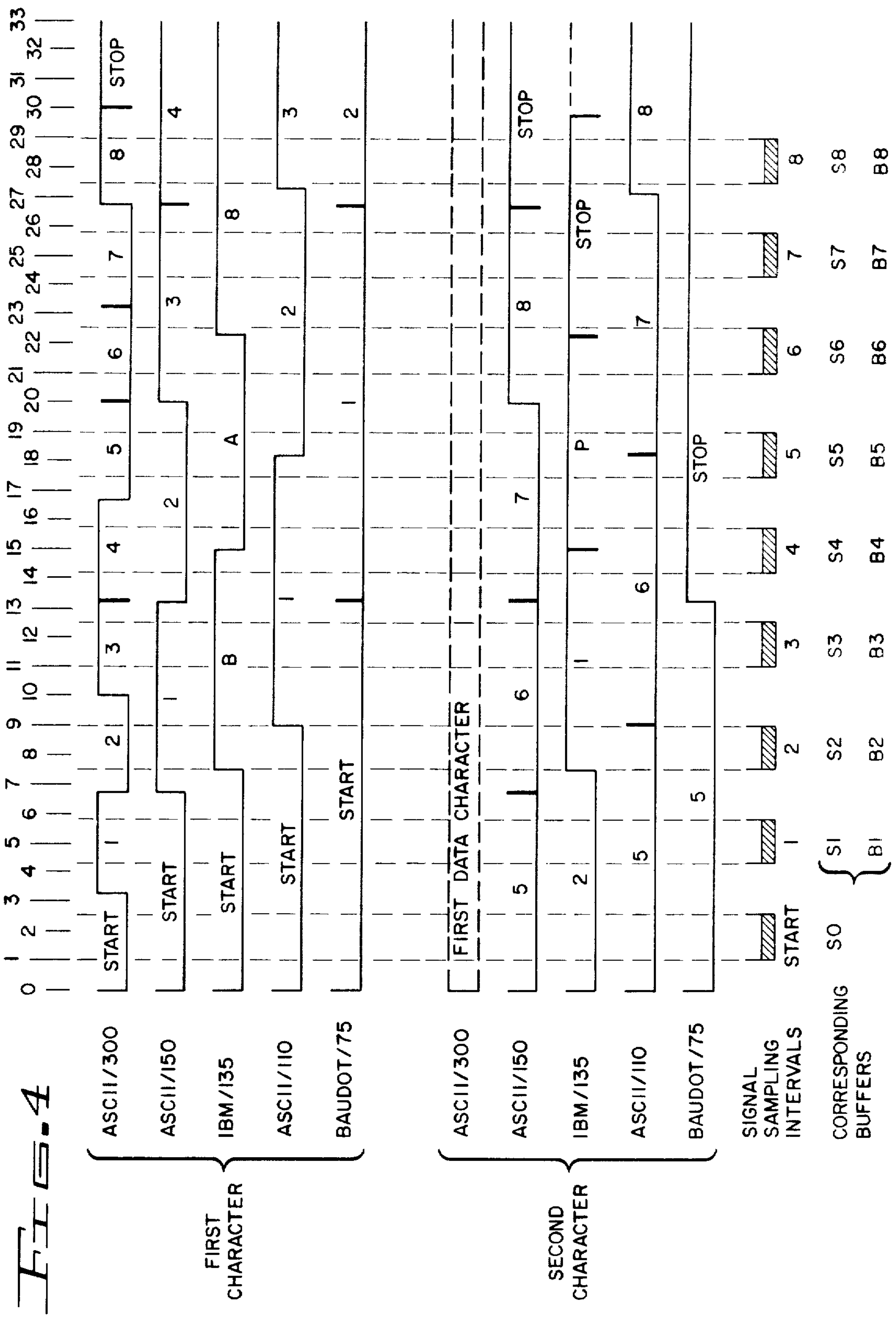
FIG. 4 is a timing diagram for a standard CARRIAGE RETURN (CR) character transmitted in various standard code-bit-rate combinations.

FIG. 4 shows the relative timing of the information bits comprising a CARRIAGE RETURN (CR) character transmitted in the code-bit-rate combinations assigned to Remote Terminals 1 through 5 in FIG. 1. The first line of the diagram represents the entire ASCII/300 CR character which is completely transmitted during the first character period of just over 33 milliseconds. Because the other CR characters are transmitted at substantially lower rates, no more than one half of any of the other characters can be transmitted within the First Character period. Accordingly, the timing diagram of FIG. 4 has been divided into two portions. The upper or First Character portion represents the timing relationship between the various CR characters during the first 33 milliseconds. The lower, or Second Character portion, of FIG. 4 illustrates the timing relationship between the various CR characters during a subsequent 33 millisecond period.

Immediately below the Second Character portion of FIG. 4 are Signal Sampling Intervals numbered 1 through 8 and a Signal Sampling Interval labeled START. The various bits comprising an incoming character are sampled during these Signal Sampling Intervals through the cooperation of the Character Synchronization Unit 17 and the Character Decode Unit 18 shown in FIG. 1.

The function of Buffers S0 through S8 and Buffers B1 through B8 shown in the detailed representation of the Character Synchronization Unit in FIGS. 7a and 7b will be described in detail below. It will suffice to point out that these buffers receive the information sampled during the Signal Sampling Intervals and their relation to these intervals appears in the "Corresponding Buffers" row of FIG. 4.

Table A shown in FIG. 5 is divided into vertical columns 1 through 5 and contains five horizontal rows of data corresponding to the code-bit-rate configurations assigned to Remote Terminals 1 through 5 in FIG. 1. These code-bit-rate configurations are listed in Column 1 of Table A.

Column 2 of Table A contains 8-bit binary words which represent the binary samples obtained during the First Character portion of the various CR characters when these characters are sampled at 300 baud. The various bits of the binary words in Column 2 are aligned in subcolumns having numeric designations corresponding to the numbered Signal Sampling Intervals shown near the bottom of FIG. 4. For example, the presence of a "1" in Column 2, Row 2, subcolumn 8 of Table A indicates that, when the First Character portion of an ASCII/150 CR character is sampled, the signal detected during Signal Sampling Interval 8 (FIG. 4) is a logical ONE.

Column 3 of Table A contains the octal value corresponding to the 8-bit binary words appearing in Column 2. While the binary value of the First Character portion of an ASCII/150 CR character is 11100110 (as shown in Column 2, Row 2), the corresponding octal value is 346 (as shown in Column 3, Row 2).

Columns 4 and 5 of Table A are directly analogous to Columns 2 and 3. Column 4 contains 8-bit binary words indicative of the Second Character portion of the variously encoded CR characters, while Column 5 contains the corresponding octal value of each Second Character portion.

As can be seen in FIG. 4, it is possible in certain instances for a change of state to occur during or near one or more of the Signal Sampling Intervals. In FIG. 5 an "X" is placed in the corresponding row and subcolumn of Table A to indicate this indeterminant or potentially ambiguous situation. For example, the First Character portion of the ASCII/110 CR character contains two changes of state, one during Signal Sampling Interval 5 and one near Signal Sampling Interval 2. For this reason, there are four possible octal values associated with the First Character portion of an ASCII/110 CR character: 214, 216, 234 or 236 (see Column 3 of Table A).

Because the First Character portion of both the ASCII/150 character and the IBM/135 character contain two indeterminant bits, their associated octal values may be either 306, 316, 346 or 356, as indicated in Column 3 of Table A.

In order to have unique differentiation between all possible octal values, it is necessary to perform an identical signal sampling and decode procedure on the Second Character portion of any incoming CR character. Columns 4 and 5 contain the binary and octal values associated with the Second Character portion of the various CR characters.

By way of example, if the First Character portion of an incoming CR character is found to have an octal value of 346 and its Second Character portion is found to have the octal value of 340, then the Remote Terminal which transmitted the CR character is known to be configured for ASCII/150. Similarly, if the First Character portion is decoded as a 346 and the Second Character portion is decoded as a 376, then the Remote Terminal is configured for IBM/135.

Because the ASCII/300 CR character is transmitted in its entirety during the First Character period, any Remote Terminal configured for ASCII/300 will be uniquely characterized by a First Character octal value of 215. Any character received from the terminal during the second 33 millisecond period will accordingly be conveyed to the central computer as data.

The detailed operation of the hardware embodiment of the invention shown generally in FIG. 1 and in more detail in FIGS. 6, 7a, 7b, 8a and 8b will now be described.

To initially access the time-sharing system, the Remote Terminal operator places a call over conventional telephone lines. The call is directed to a Local Data Set 12 at the computer site. Upon receipt of the call, the Local Data Set 12 causes the logical state of line 19 to change from a ZERO to a ONE.

Figure 6:
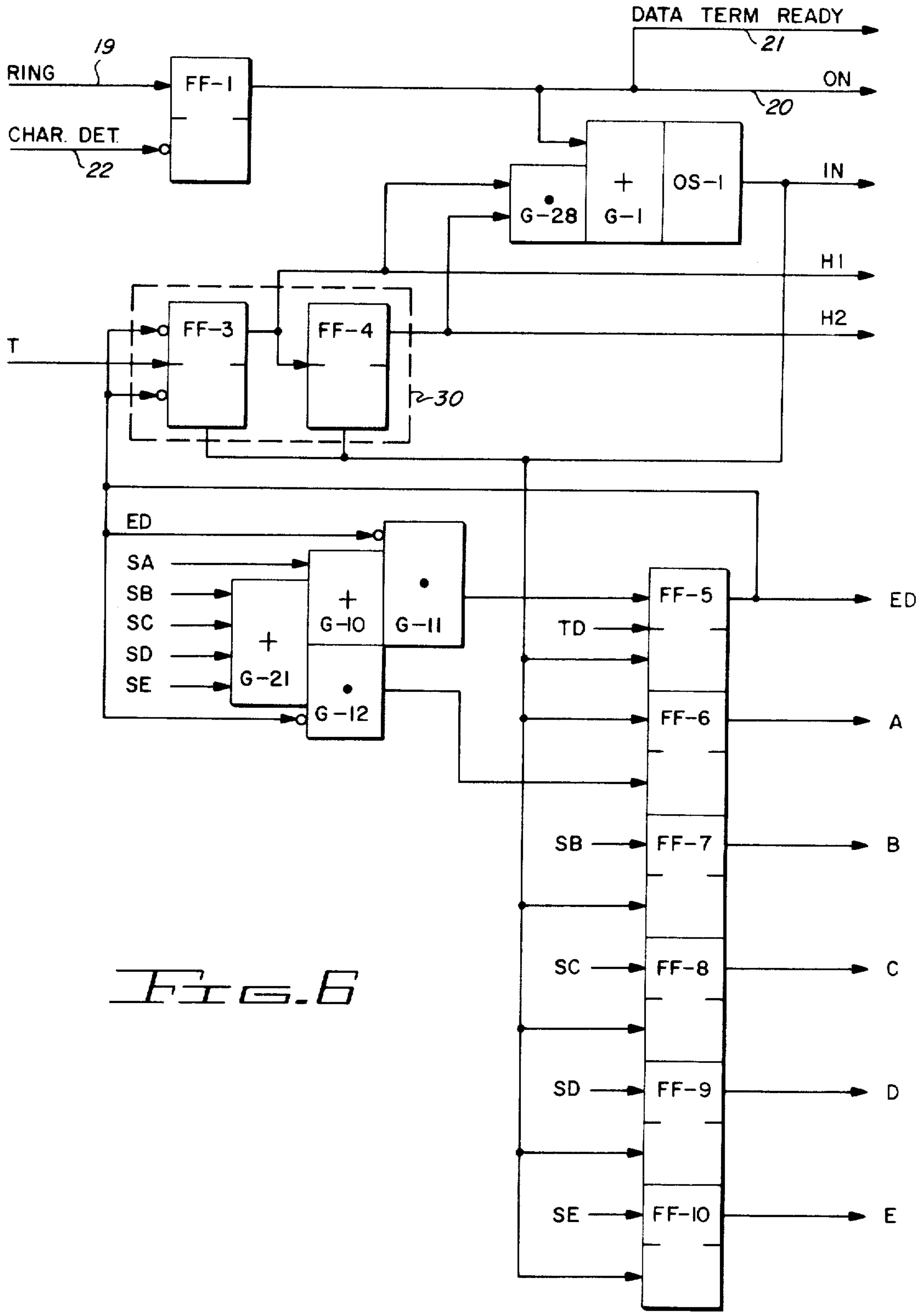
FIG. 6 illustrates one hardware embodiment which the Control Logic Unit 16 of FIG. 1 may assume.

Referring to FIG. 6 it is seen that the presence of the RING signal (a logical ONE on line 19) at the set input of flip-flop FF-1 results in the issuance of the two signals — DATA TERM READY (a logical ONE on line 21) and ON (a logical ONE on line 20). The signal DATA TERM READY serves to direct Local Data Set 12 to answer the call from the Remote Terminal and the ON signal serves to inform the Computer 13 that data communication is being established with a Remote Terminal.

When Local Data Set 12 has, in response to the DATA TERM READY signal, answered the call from the Remote Terminal, it will cause the logical state of the CHAR DET line to change from a ZERO to a ONE. In FIG. 6 it is seen that the CHAR DET signal is inverted at the reset input of flip-flop FF-1 so that this flip-flop will not be reset on the rising edge of the CHAR DET signal, but only on a subsequently occurring falling edge of this signal (i.e., when the logical state of line 22 changes back to a ZERO).

The presence of the ON signal at the upper input to OR-Gate G-1 serves to enable this gate which in turn activates the One-Shot OS-1. The One-Shot OS-1 issues initialize pulse IN. Initialize pulse IN resets the two flip-flops FF-3 and FF-4 which comprise H-Counter 30, sets flip-flop FF-6 and resets flip-flops FF-5, FF-7, FF-8, FF-9 and FF-10. It should be noted that flip-flop FF-6 is set, rather than reset, by initialize pulse IN so that the system will be initially configured to receive data in ASCII/300.

Figure 7A:
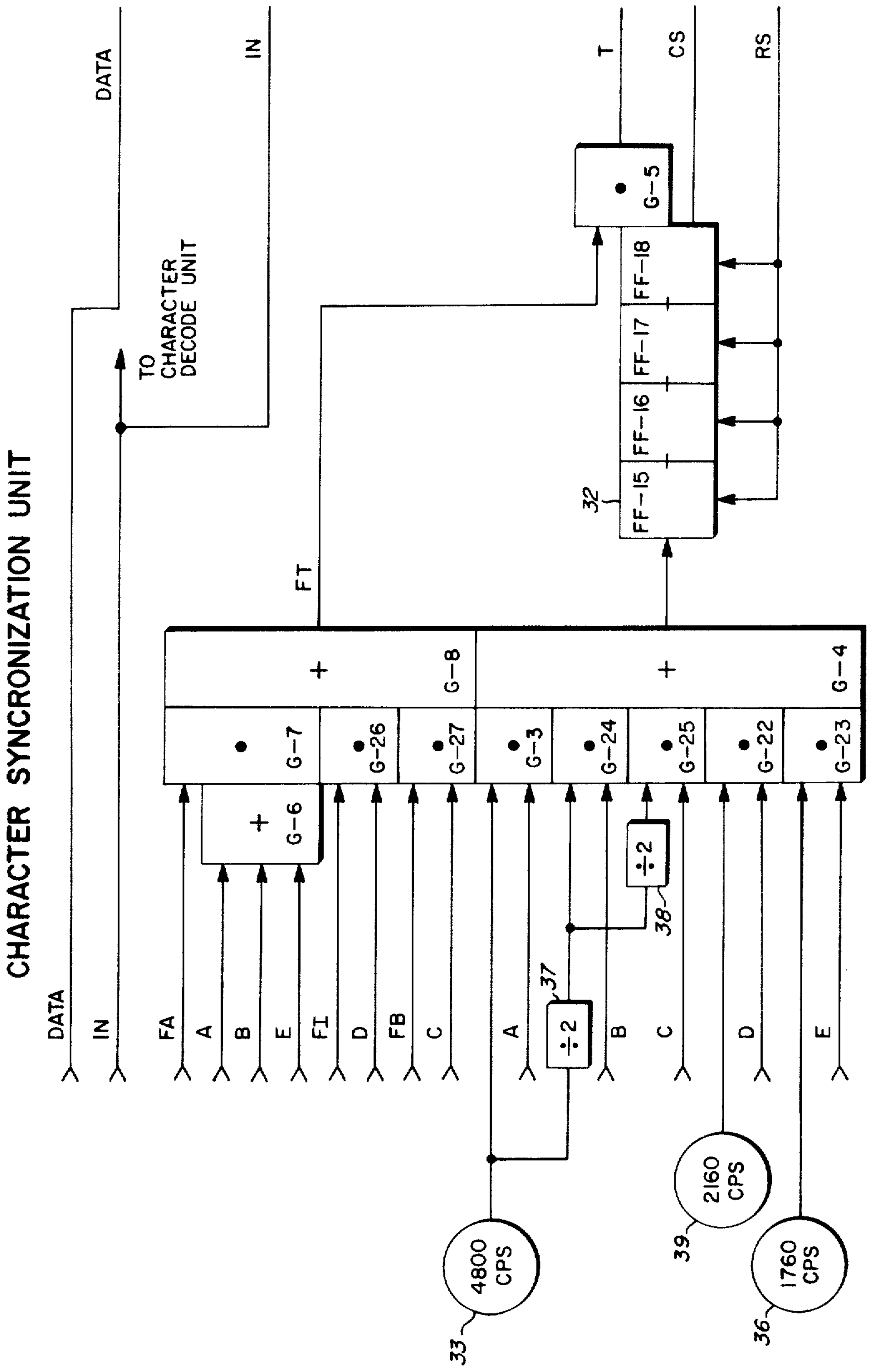
FIGS. 7*a* and 7*b*, when arranged together as indicated in FIG. 7*c*, represent one hardware embodiment which the Character Synchronization Unit 17 of FIG. 1 may assume.
Figure 7B:
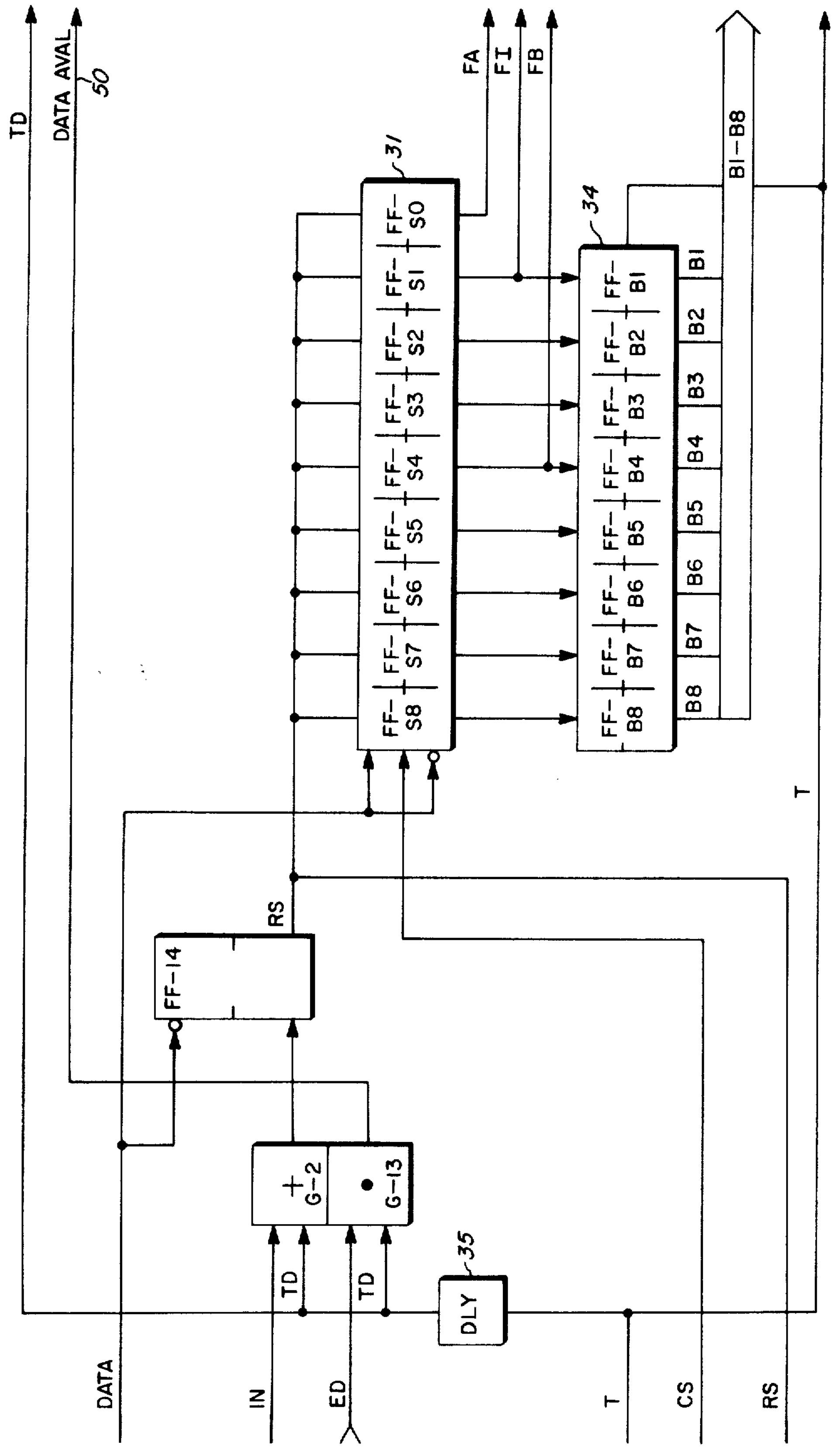

The IN pulse also serves to initialize the Character Synchronization Unit shown in FIGS. 7a and 7b. In particular, the IN pulse enables OR-Gate G-2 (FIG. 7b), which in turn resets flip-flop FF-14. In its reset state, flip-flop FF-14 issues the signal RS which sets each of the nine flip-flops FF-S0 through FF-S8 comprising S-Buffer 31. When the flip-flops of S-Buffer 31 are in the set state, the associated reset outputs S0 through S8 are at logical ZERO levels. The signal RS also resets the four flip-flops FF-15 through FF-18, comprising the C-Counter 32 in FIG. 7a.

Figure 8A:
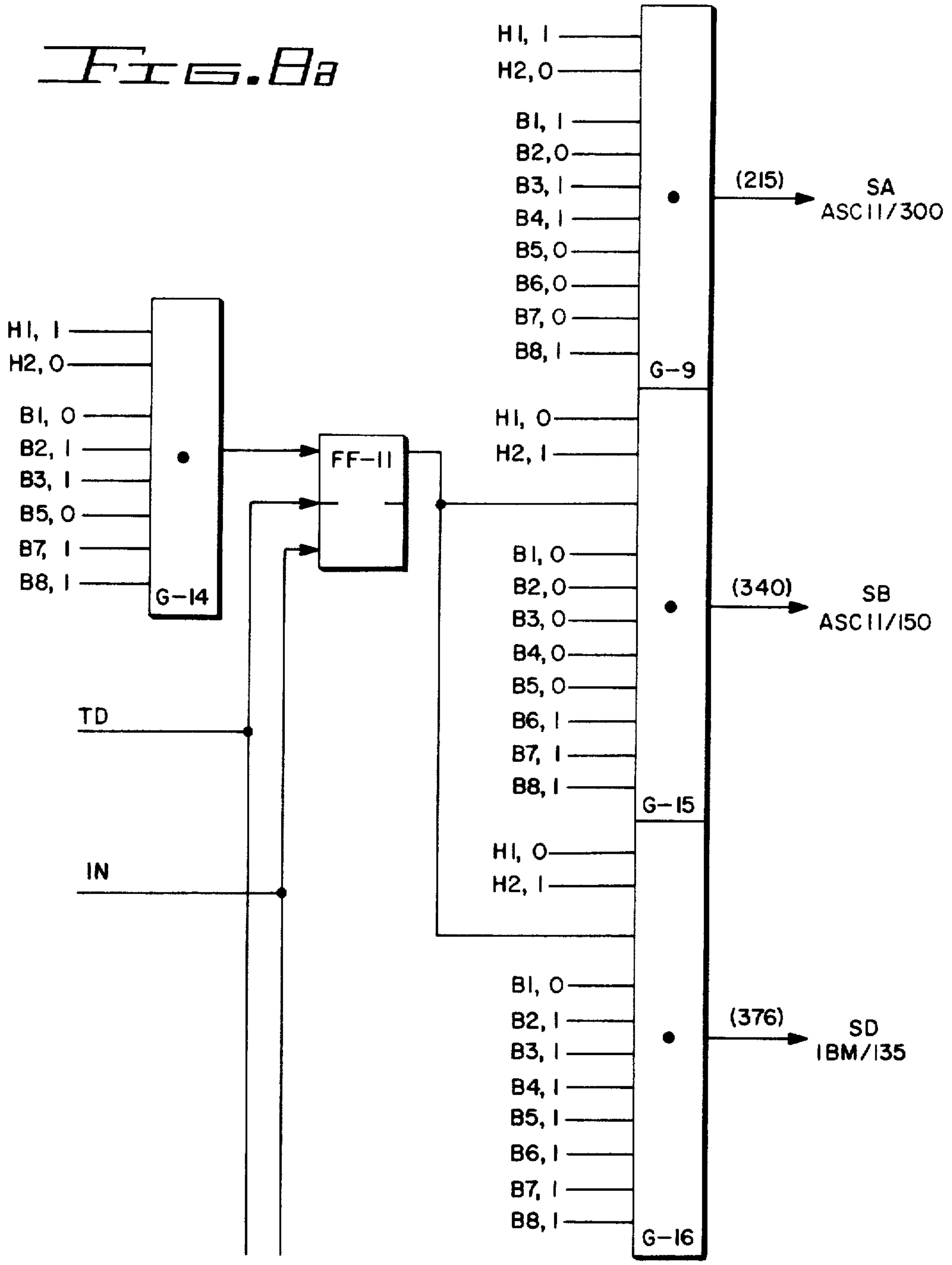
FIGS. 8*a* and 8*b*, when arranged together as indicated in FIG. 8*c*, represent one hardware embodiment which the Character Decode Unit 18 of FIG. 1 may assume.
Figure 8B:
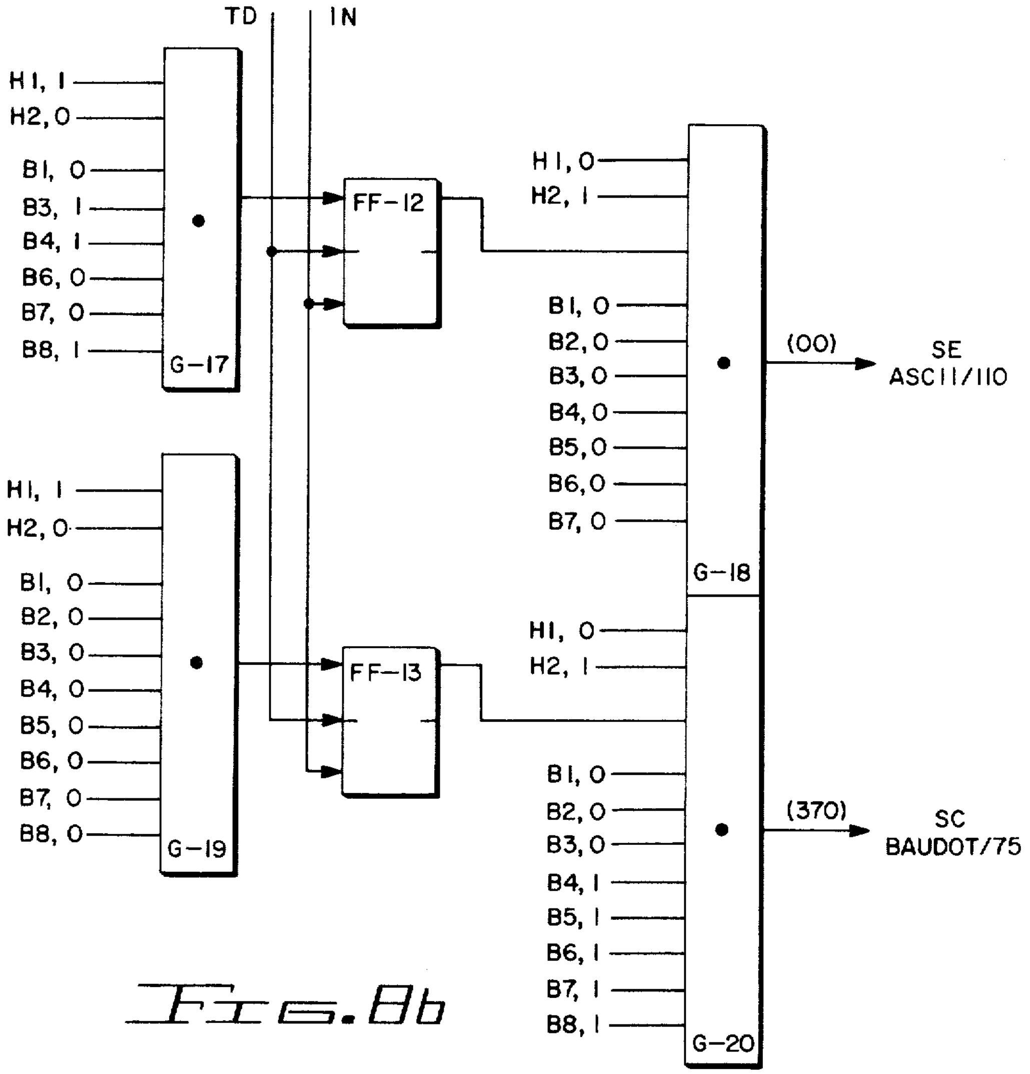

The initialize signal IN is also used to reset flip-flops FF-11, FF-12 and FF-13 in the Character Decode Unit shown in FIGS. 8a and 8b.

At this point, Local Data Set 12 has answered the incoming call, established electrical communication with the Remote Terminal, and caused the various units in the Line Adapter to be initialized.

The fact that electrical communication has been established between the Remote Terminal and the Local Data Set is indicated to the remote terminal operator by an appropriate indicia such as the presence of an audio tone. At this point the operator may proceed to communicate with the central system.

Typically, in the case of teletype terminals, the carriage or type head will not be initially aligned for typing information from the extreme left of the paper. Accordingly, the operator must first press the CARRIAGE RETURN (CR) key at his console to assure himself that the terminal is in the initial position. If the particular remote terminal in use is equipped with an answer-back drum, the operator may press the appropriate key and thereby both place his teletype carriage in its initial position and transmit an identification message to the central system. As was pointed out earlier, the first character transmitted by the answerback drum is a CR character followed by a terminal identification message. Furthermore, because the central system will be configured to receive data in the particular code-bit-rate combination associated with the Remote Terminal immediately after the CR character is received, there will be no loss of information and the Remote Terminal identification following the CR character will be received and properly interpreted. It should be noted that an additional improvement over prior art systems resides in the fact that the present invention precludes the printing of any undesirable characters at the Remote Terminal during the call up and identification process.

After pressing the CR key, the operator of the Remote Terminal may proceed to exchange data with the central system. The CR character transmitted from the Remote Terminal arrives at the Character Synchronization Unit 17 of the Line Adapter 15 over DATA line 23 as shown in FIGS. 1, 7*a* and 7*b*. The First and Second Character portions of the incoming CR bit, as substantially shown and described in conjunction with FIG. 4, are received at the input to the S-Buffer 31 shown in FIG. 7*b*.

The leading edge of the incoming START bit serves to set flip-flop FF-14, thereby removing the RS signal from the flip-flops of S-Buffer 31 (FIG. 7*b*) and C-Counter 32 (FIG. 7*a*).

Because the flip-flop FF-6 in the Control Logic Unit shown in FIG. 6 was initially set, rather than reset, by initialized pulse IN, the A output of this flip-flop will be in the logical ONE state. Referring now to FIG. 7*a*, it is seen that the A signal issuing from flip-flop FF-6 enables AND-gate G-3 of the Character Synchronization Unit. With AND-gate G-3 enabled 4800 cycles per second, timing signals pass from Timing Generator 33, through AND-gate G-3 and OR-gate G-4, to the input to C-Counter 32. The presence of the A signal at the input to AND-gate G-3 indicates that the system is initially configured for ASCII/300, regardless of the particular code-bit-rate in which the CR character is transmitted.

The frequency of Timing Generator 33 is 16 times greater than the 300 baud transmission rate characterizing ASCII/300.

When the C-Counter 32 has counted eight of the incoming timing signals, the last stage of the counter, flip-flop FF-18, is switched to its set state. As a result, the signal CS which was imposed on the reset output of flip-flop FF-18 during the initialize procedure, drops. The falling edge of signal CS serves to shift the START bit into the S-Buffer 31 (FIG. 7*b*).

The C-Counter 32 continues to count through 16 additional counts to the next eight-count state, at which time the signal CS (which reappeared on the ZERO count) will again drop. The falling edge of the CS signal causes the second consecutive bit (numbered 1 in FIG. 4) in the incoming CR character to be serially shifted into the S-Buffer 31. Thus, each time the Timing Generator 33 advances the C-Counter to its eight-count state, another bit of information will be shifted into the S-Buffer 31.

After some 33 milliseconds, the First Character portion of the incoming CR character will have been shifted into the S-Buffer 31. Referring to FIGS. 4 and 5, when the First Character portion of, for example, an ASCII/150 CR character is in S-Buffer 31, the output S0 from flip-flop FF-S0 will be at a logical ZERO level, the output S1 from flip-flop FF-S1 will be at a logical ZERO level, the output S2 from flip-flop FF-S2 will be at a logical ONE level, and so on. Thus, as can be seen, the logical state of each of the outputs from the S-Buffer 31 are shown graphically in FIG. 4 and numerically in Table A of FIG. 5.

Since flip-flop FF-S0 of the S-Buffer 31 was initially forced into the set state by signal RS, it will switch to the reset state when the START bit (always a logical ZERO) is shifted into it. When the START bit is shifted into flip-flop FF-S0, the signal FA will use therefrom.

Referring to FIGS. 7*a* and 7*b*, the shifting of the START bit into flip-flop FF-S0 of the S-Buffer 31 results in the issuance of the transfer signal T from AND-gate G-5. In particular, the output of OR-gate G6 (which has been enabled by the configuration signal A) and the signal FA, combine to fully enable AND-gate G-7, which in turn enables OR-gate G-8. The output of OR-gate G-8, the signal FT in combination with the set output of flip-flop FF-18 of C-Counter 32 (which appeared at the time the START bit was shifted into flip-flop FF-S0 of the S-Buffer 31), combine to fully enable AND-gate G-5 which issues the transfer signal T.

The transfer signal T strobes the flip-flops FF-B1 to FF-B8 of the B-Buffer 34. This results in the parallel transfer of information into the B-Buffer 34 from the corresponding flip-flops FF-S1 through FF-S8 of the S-Buffer. At the time of this transfer, the First Character portion of the incoming CR character has been completely shifted into the S-Buffer. Delay 35 serves to retard the transfer signal T for a sufficient time to allow the bits of data in the S-Buffer 31 to be parallel loaded into B-Buffer 34.

Referring to FIG. 6, it is seen that the transfer signal T also serves to increment the H-Counter 30 from its initial binary count of 00 (to which it was set by the initialized pulse IN) to the next binary count 01. When H-Counter 30 contains the 01 count, output H1 is a logical ONE and output H2 is a logical ZERO.

The delayed transfer signal TD enables OR-gate G-2 which in turn resets flip-flop FF-14. In its reset state, flip-flop FF-14 again issues signal RS which reinitializes the flip-flops FF-S0 through FF-S8 of S-Buffer 31 and the flip-flops FF-15 through FF-18 of C-Counter 32.

The First Character portion of the incoming CR character is now stored for examination in the B-Buffer 34. The S-Buffer 31 and the C-Counter 32 are reinitialized to receive the Second Character portion of the incoming CR character.

The outputs B1 through B8 from the eight flip-flops comprising the B-Buffer 34 are connected to the various AND-gates of the Character Decode Unit shown in FIGS. 8*a* and 8*b*. Also connected to these AND-gates are the outputs H1 and H2 from the H-Counter 30 shown in FIG. 6.

If the CR character transmitted from the Remote Terminal was in ASCII/300, the B-Buffer 34 will contain the logical values indicated in Column 2, Row 1 of Table A (FIG. 5). Since the input conditions for AND-gate (FIG. 8*a*) are satisfied, the decode signal SA will issue therefrom. The H-Counter is in the 01 state, as indicated by the notations "H1,1" and "H2,0" at the upper input to AND-Gate G-9. The notations "B1,1", "B2,0", etc. indicate that the B1 output from flip-flop FF-B1 in the B-Buffer 34 is at a logical ONE level while the B2 output from the flip-flop FF-B2 is at a logical ZERO level.

Table A in FIG. 5 indicates that an incoming ASCII/300 CR character is uniquely determined by an examination of the First Character portion. Accordingly, information received during the Second Character period is data to be processed by the central system and will be transmitted to Computer 13 as such. Because the system was initially configured to receive ASCII/300 characters, no reconfiguration need be performed.

The decode signal SA which issues from AND-gate G-9 in the Character Decode Unit enables OR-gate G-10 (FIG. 6). Because the set output from flip-flop FF-5 was initialized to ZERO by pulse IN, the inverted signal at the upper input to AND-gate G-11 is a logical ONE. This input, combined with the output from OR-gate G-10 fully enables AND-gate G-11. The output from AND-gate G-11 sets flip-flop FF-5 which issues the signal ED upon the occurrence of delayed timing signal TD.

With the issuance of the signal ED from flip-flop FF-5, the AND-gates G-11 and G-12 become disabled and the H-Counter 30 cannot be advanced further. The coincidence of signal ED and the delayed timing signal TD enables AND-gate G-13 (FIG. 7*b*) which issues the signal DATA AVAL. The signal DATA AVAL indicates to Computer 13 that data is available in the B-Buffer and may be parallel loaded into Computer 13 at any time prior to the occurrence of the next transfer signal T.

Until the system is again initialized by an incoming RING signal to flip-flop FF-1 of the Control Logic Unit in FIG. 6, the system will remain configured as it is and will continue to process data characters in ASCII/300. The operational sequence for receiving subsequent data is identical to that for receiving the First Character portion of the ASCII/300 CR character. The START bit of the incoming character sets flip-flop FF–14 removing the signal RS from S-Buffer 31 and C-Counter 32; C-Counter 32 is driven at 16 times the transmission rate of the incoming data; the signal CS drops as the eight count state of the C-Counter 32 is reached and thus sequentially shifts subsequent bits of the incoming data character into the S-Buffer 31; the signal FA appears when the START bit enters flip-flop FF–S0 of the S-Buffer 31; the signal FA results in the issuance from AND-gate G–5 of the transfer signal T which causes the data character in the S-Buffer 31 to be parallel loaded into the B-Buffer 34 for subsequent parallel loading into the Computer 13.

Figure 8C:
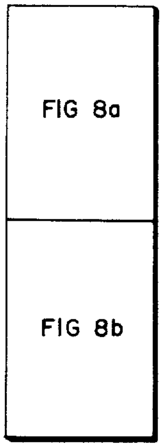
Figure 7C:
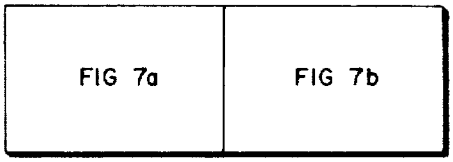

If the First Character portion of the incoming CR-Character is not a 215 (indicating ASCII/300) but is either a 306, 316, 346 or 356, the input conditions to AND-gate G–14 of the Character Decode Unit shown in FIG. 8, will be satisfied and the output therefrom will, on the next delayed transfer pulse TD, set the flip-flop FF–11 which had been placed in its reset condition by the initialized pulse IN.

By the time the Second Character portion of the particular incoming CR-Character has been shifted into the S-Buffer 31, the state of the H-Counter 30 has been advanced from the binary count of 01 to the binary count of 10 by signal T. If the Second Character portion of the incoming CR character is decoded as a 340, AND-gate G–15 of the Character Decode Unit will be fully enabled and decoder signal SB will issue therefrom, indicating that the remote terminal is configured in ASCII/150. If the Second Character portion of the incoming CR character is decoded as a 376, then the AND-gate G–16 of the Character Decode Unit will be fully enabled and decode signal SD will issue therefrom, indicating that the remote terminal is configured for IBM/135.

In a similar manner, if the First Character portion of the incoming CR character is decoded as either a 214, 216, 234 or 236, the input conditions to AND-gate G–17 of the Character Decode Unit shown in FIG. 8*b* will be satisfied and the output therefrom will set the flip-flop FF–12 on the next delayed transfer pulse TD. If the Second Character portion of this incoming CR character is decoded as either 000 or 200, AND-gate G–18 will be fully enabled and decode signal SE will issue therefrom, indicating that the Remote Terminal is configured for ASCII/110.

Finally, if the First Character portion of the incoming CR Character is decoded as a 000, the input conditions to AND-gate G–19 of the Character Decode Unit shown in FIG. 8*b* will be satisfied and the output therefrom will set the flip-flop FF–13 on the next occurring delayed transfer pulse TD. If the Second Character portion of this CR Character is decoded as a 370, AND-gate G–20 will be fully enabled and decode signal SC will issue therefrom, indicating that the Remote Terminal is configured in BAUDOT/75.

The function of decode signal SA, which appears when the Remote Terminal is configured for ASCII/300, has been described in detail above. The function of decode signals SB through SE can be adequately described with reference to any one of the decode signals, such as SD.

Decode signal SD enables OR-gate G–21 in the Control Logic Unit shown in FIG. 6. AND-gate G–12 is partially enabled because the absence of an ED signal results in the presence of a logical ONE at its lower input. AND-gate G–12 is fully enabled by the output of OR-gate G–21. The output from AND-gate G–12 resets flip-flop FF–6, thereby extinguishing configuration signal A. The decode signal SD also sets flip-flop FF–9, resulting in the issuance therefrom of the configuration signal D.

Referring to FIG. 7*a*, it is seen that the configuration signal D enables AND-gate G–22 and allows the timing signals from Timing Generator 39 to pass through AND-gate G–22 and OR-gate G–4 to the input of C-Counter 32. In this case, the frequency of the Timing Generator 39 (2160 cps) is 16 times higher than the bit rate associated with the transmission of IBM/135 characters.

In a similar manner, configuration signal E enables AND-gate G–23 allowing the passage of timing signals from Timing Generator 36 to the input of the C-Counter 32. In this case, the frequency of Timing Generator 36 is sixteen times the transmission rate associated with ASCII/110 characters.

The Divide-By-Two units 37 and 38 provide timing signals to the input of the C-Counter 32 through AND-gate G–24 and AND-gate G–25 when one of the associated configuration signals B or C occurs. The frequency of the timing signals appearing at the output of the Divide-By-Two unit 37 is 2400 cycles per second, which corresponds to a frequency sixteen times as great as the transmission rate associated with ASCII/150 characters. The frequency of the timing signals appearing at the output of the Divide-By-Two unit 38 is 1200 cycles per second, which corresponds to a frequency 16 times that of the transmission rate associated with BAUDOT/75 characters.

With further reference to FIG. 7*a*, the appearance of any one of the configuration signals A through E in combination with the occurrence of an appropriate one of the signals FA, FI or FB from the S-Buffer 31 will enable one of the AND-gates G–7, G–26 or G–27. An output from either AND-gate G–7, G–26 or G–27 will enable OR-gate G–8. The output from OR-gate G–8 will result in the issuance of transfer signal T upon the occurrence of an eight-count in the C-Counter 32.

As was pointed out earlier, the transfer signal T serves to parallel load information contained in the S-Buffer 31 into the B-Buffer 34 while also advancing the count in the H-Counter 30.

The output from OR-gate G–21 of Control Logic Unit shown in FIG. 6 also serves to enable OR-gate G–10. Due to the absence of an ED signal at the inverted input to AND-gate G–11, this gate becomes fully enabled upon the appearance of an output from OR-gate G–10. The output from AND-gate G–11 serves to set the flip-flop FF–5. The signal ED which issues from the flip-flop FF–5 disables both AND-gate G–11 and AND-gate G–12. The signal ED also serves to inhibit the advance of H-Counter 30.

If the operator of the Remote Terminal pressed some key other than the CARRIAGE RETURN (CR) key, the First and Second Character portions received would not comply with the decode tests inherent in the Character Decode Unit and none of the decode signals SA through SE would occur to set flip-flop FF–5. Since flip-flop FF–5 is not set, signal ED is not present to disable the H-Counter 30. The occurrence of a third FA signal from the S-Buffer 31 of the Character Synchronization Unit (FIG. 7*b*), indicating the reception of a "Third Character" portion, would result in the issuance of a third FT character from the OR-gate G–8 (FIG. 7*a*) and thus the issuance of a third transfer signal T from the AND-gate G–5. The appearance of a third transfer signal T at the input of the H-Counter 30 will increment H-Counter 30 from a binary count of 10 (set by the transfer of the Second Character portion to the B-Buffer 34) to the binary count of 11. A binary count of 11 fully enables AND-gate G–28 which in turn enables OR-gate G–1. The output of OR-gate G–1 activates the One-Shot OS–1 which issues an initialized pulse IN, starting the entire process of receiving incoming characters again. This process may be allowed to continue ad infinitum or an accompanying timer may be incorporated to limit the number of improper identification characters which may be sent from the Remote Terminal.

Finally, when the Remote Terminal operator has completed his exchange with the Computer 13, he terminates his call by disconnecting his Remote Terminal from the telephone lines. Disconnection of the Remote Terminal will cause the signal on the CHAR DET line 22 to become a logical ZERO. The flip-flop FF–1 is reset by the falling edge of the CHAR DET signal resulting in the removal of the DATA TERM READY signal from Local Data Set 12 and the ON signal from the Computer 13.

Figure 2:
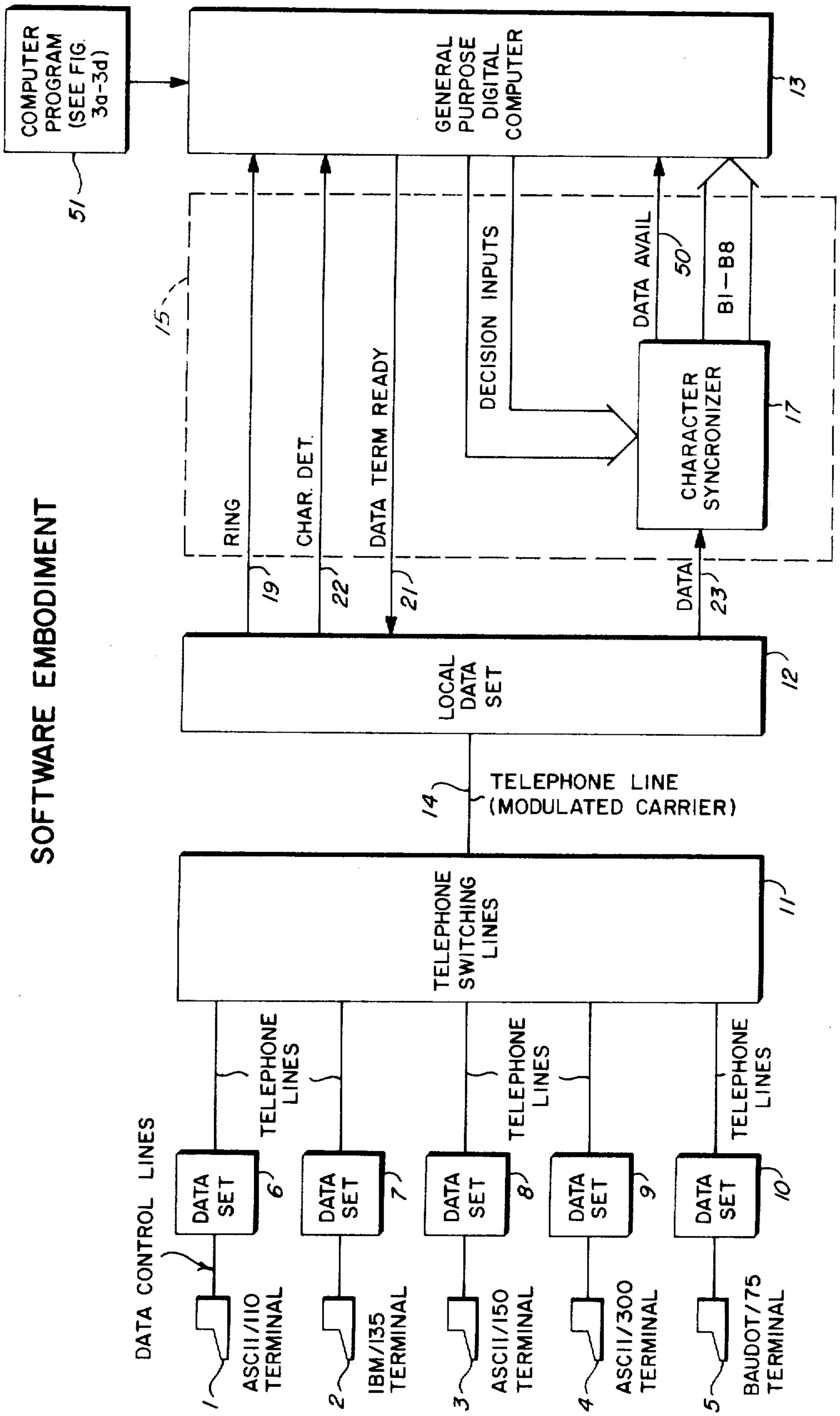
FIG. 2 is a generalized block diagram showing a software embodiment of the invention in a time-shared computer system.

FIG. 2 shows an alternative embodiment of the invention wherein the decision-making functions of Control Logic Unit 16 and Character Decode Unit 18, shown in the hardware embodiment of the invention in FIG. 1, have been replaced by Computer Program 51. The Computer Program 51 in effect configures the existing hardware of General Purpose Digital Computer 13 to perform the functions which were previously executed by specific extrinsic apparatus.

Figure 3A:
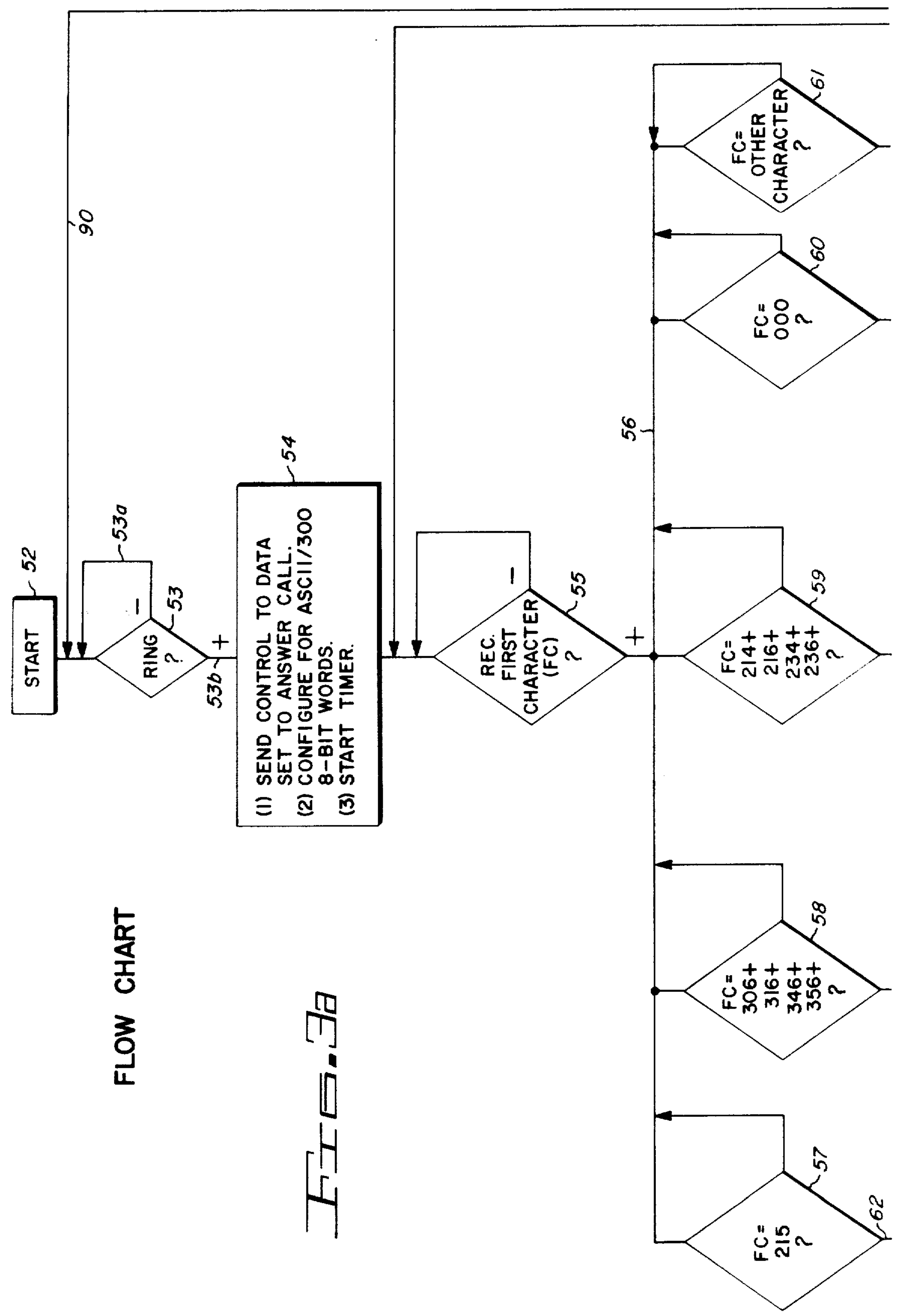
FIGS. 3*a*, 3*b* and 3*c*, when arranged together as indicated in FIG. 3*d*, comprise a flow chart indicating the principal steps executed by a typical computer program implementing the invention.
Figure 3B:
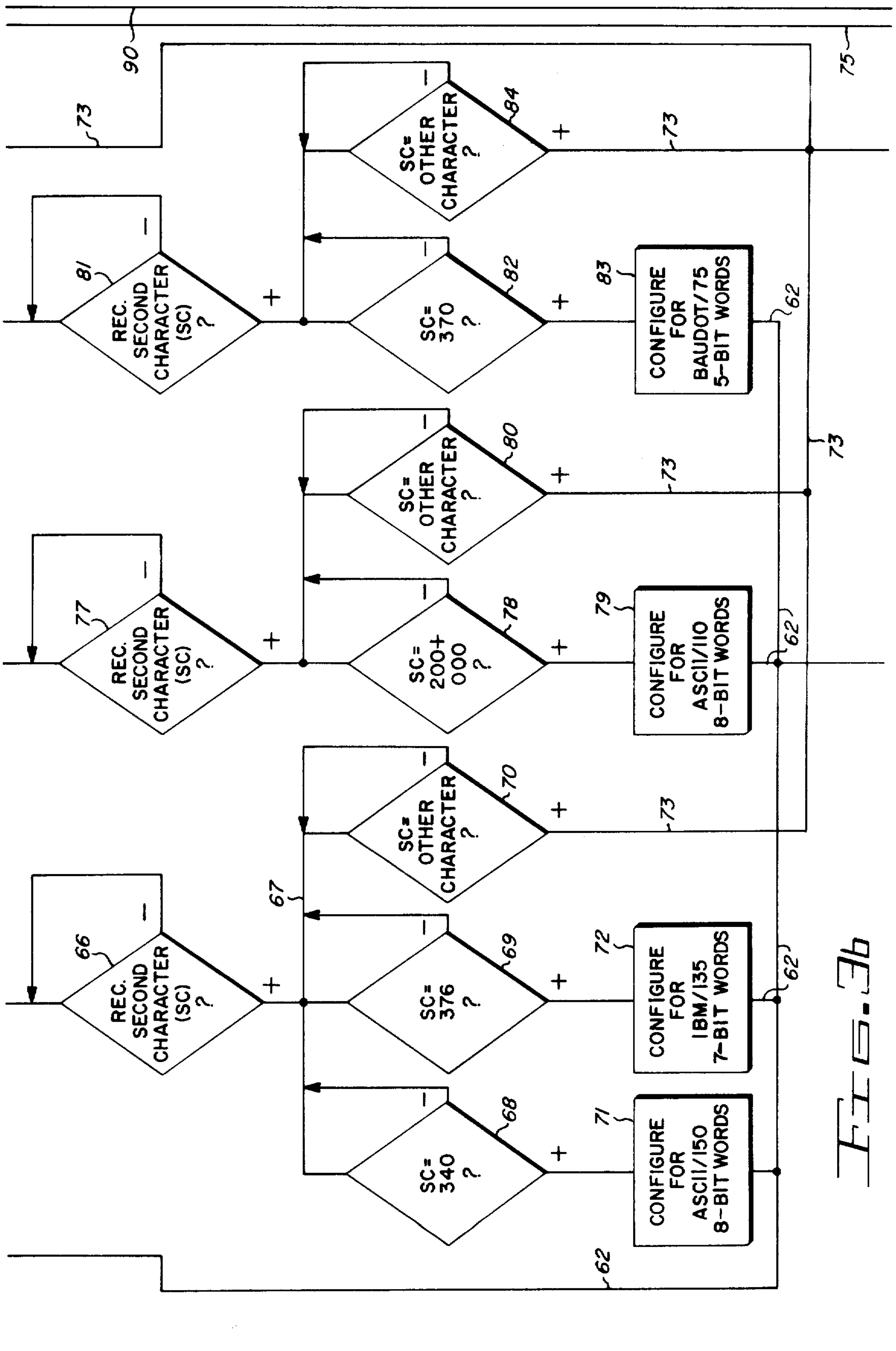
Figure 3C:
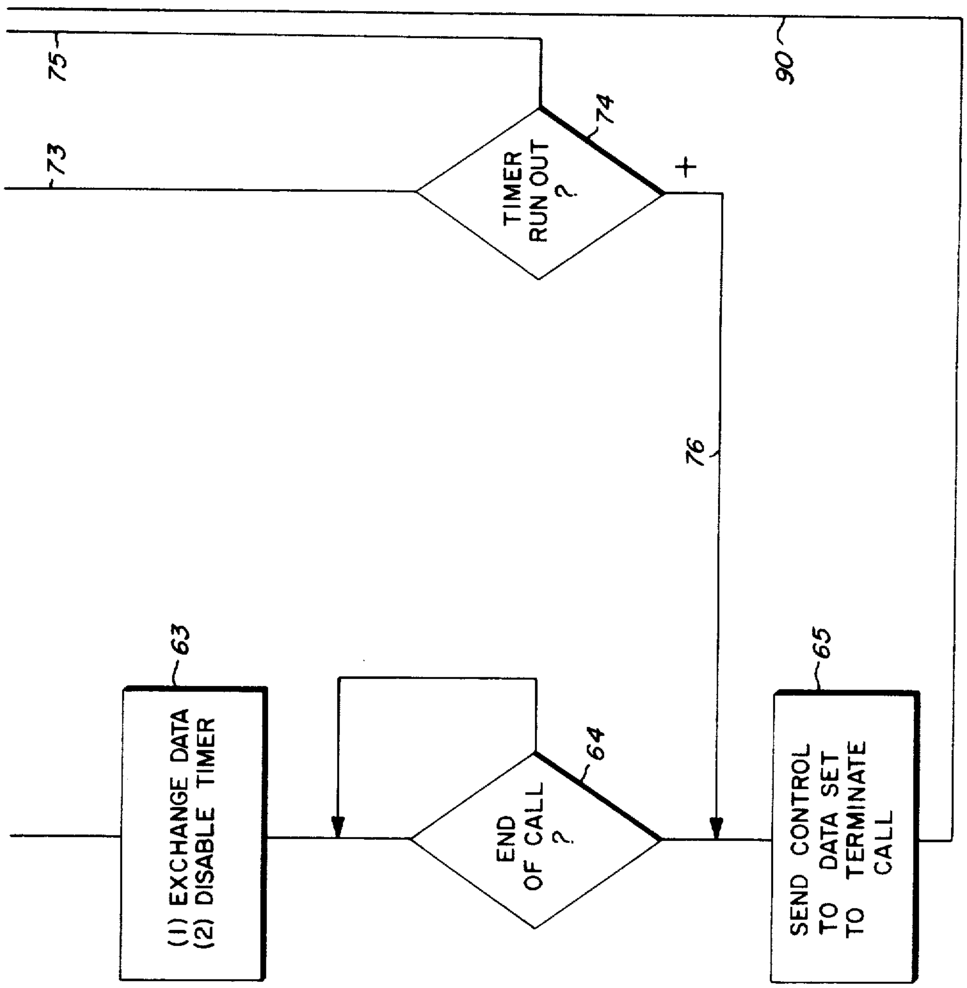
Figure 3D:
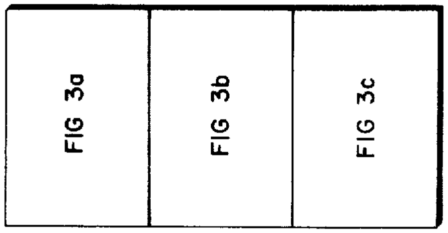

The basic steps characterizing the Computer Program 51 are presented in flow chart form in FIGS. 3a, 3b and 3c. Start Block 52 indicates the point in the flow chart at which the execution of Computer Program 51 is initiated. The first test executed by the program is the determination of whether a RING signal is being received from Local Data Set 12, indicating that a Remote Terminal is attempting to achieve electrical communication with the central system. This test is indicated generally by Decision Block 53. If the result of the test made by Decision Block 53 is negative, indicating the absence of any RING signal, the program will return (along line 53a) to its initial position at the output of Start Block 52. If, on the other hand, the result of the test made by Decision Block 53 is affirmative, indicating the presence of a RING signal, the program will proceed (along line 53b) to execute the commands indicated in Command Block 54.

In accord with the commands of Command Block 54, the program will cause the General Purpose Digital Computer 13 to: (1) send a control signal to the Local Data Set 13 (in this case a DATA TERM READY signal) ordering the Local Data Set 12 to answer the call from the remote terminal; (2) initially configure the system for the reception of ASCII/300 eight bit words; (3) start a timer which will allow a given amount of time for the establishment of data communication between the Remote Terminal and the Computer 13.

When the operations outlined in Command Block 54 have been executed, the computer program continues to Decision Block 55. Decision Block 55 tests to see if the First Character portion of an incoming CARRIAGE RETURN (CR) character has been received. If the result of the test performed by Decision Block 55 is affirmative, indicating that the first character portion of the incoming CR character has been received, the program will proceed, via Simultaneous Test Line 56, to the inputs of Decision Blocks 57 through 61.

Decision Block 57 tests to see if the First Character (FC) portion of the incoming CR character has an octal value equal to 215. If the result of the test made by Decision Block 57 is affirmative, the system will remain configured for the reception of ASCII/300 characters and the program will proceed over Exchange Data Line 62 to Command Block 63 (FIG. 3c).

In executing the operations outlined in Command Block 63, the program enables the central system to exchange data with the Remote Terminal and at the same time disables the timer which had been set by Command Block 54 (FIG. 3a). When the operator of the Remote Terminal has completed his use of the central system, he will terminate his call (resulting in the disappearance of the signal CHAR DET issuing from Local Data Set 12). Decision Block 64 tests for the termination of the call from the Remote Terminal. When the result of the test performed by Decision Block 64 is affirmative, the program will proceed to Control Block 65 which will order the generation of a control signal indicating the termination of electrical communication with the Remote Terminal. The program will then return, via Return line 90 to the input to Decision Block 53 to await another incoming call.

Returning to FIG. 3a it is seen that Decision Blocks 58, 59 and 60 perform functions similar to the one performed by Decision Block 57. Decision Block 58 tests the First Character portion of the incoming CR character to determine whether it has an octal value of either 306, 316, 346 or 356. If the result of the test performed by Decision Block 58 is affirmative, indicating that the incoming CR character is in either ASCII/150 or IBM/135, the program will continue to Decision Block 66 where it will test for the reception of a Second Character portion of the incoming CR character. When the second character portion of the CR character is received, the program proceeds over Simultaneous Test Line 67 to Decision Blocks 68, 69 and 70. Decision Block 68 tests to see whether the Second Character portion of the incoming CR character has an octal value of 340. If the result of this test is affirmative, the program proceeds to Command Block 71 which causes the system to become configured for the reception of eight-bit characters in ASCII/150. When the operations of Command Block 71 have been executed, the program proceeds along Exchange Line 62 to Command Block 63 and completes the exchange sequence previously described.

Similarly, if the First Character portion of the incoming CR character has an octal value of either 306, 316, 346 or 356 and if the Second Character portion of this incoming CR character meets the test of Decision Block 69, namely that the Second Character portion has an octal value of 376, then the program will proceed to Command Block 72 and will cause the central system to be configured for the reception of seven-bit IBM/135 characters. Upon the execution of the configuration operation indicated in Command Block 72, the program proceeds along Exchange Line 62 to Command Block 63 and completes the exchange sequence previously described.

If the tests of both Decision Block 68 and Decision Block 69 are negative, then the Second Character portion of the particular incoming CR character will satisfy the "other character" test of Decision Block 70. In such a case, the Second Character portion of the CR character does not represent a valid code and the program will proceed along line 73 to Decision Block 74. Decision Block 74 tests to see if the timer set by Command Block 54 in FIG. 3a has run out. If the timer has not run out the program will proceed along line 75 to Decision Block 55. The program will then cause the First and Second Character portions of the next incoming character to be tested to see if it meets one of the criteria inherent in the various decision blocks comprising the program. If no valid set of characters is received within the allotted time, the timer will run out and the program will proceed along line 76 from Decision Block 74 to Control Block 65. The operation of Control Block 65 will then result in the termination of electrical communication with the Remote Terminal.

If the First Character test indicated by Decision Block 59 is affirmative and if the second character test indicated by Decision Blocks 77 and 78 is affirmative, then the program will proceed to Control Block 79. The operation of Control Block 79 will cause the system to be configured to receive eight-bit ASCII/110 characters. Upon such configuration of the system, the program will proceed along Exchange line 62 to Control Block 63 and completes the exchange sequence previously described. If the Second Character portion of the particular incoming CR character does not satisfy the Second Character test of Decision Block 78, then the Second Character test of Decision Block 80 will be satisfied and the program will proceed along line 73 to Decision Block 74 to execute the "-timer runout" sequence described previously.

If the First Character test of Decision Block 60 and the Second Character test of Decision Blocks 81 and 82 are affirmative, the program will proceed to Control Block 83. The operation of Control Block 83 will cause the system to be configured to receive five-bit BAUDOT/75 characters. If the Second Character test of Decision Block 82 is not satisfied, then the Second Character test of Decision Block 84 will be satisfied and the "timer runout" sequence will be executed.

Of course if none of the First Character tests of Decision Blocks 57, 58, 59 and 60 are affirmative, then the First Character test of Decision Block 61 will be affirmative, indicating that a valid First Character portion was not received. In this case the program will proceed over line 73 to Decision Block 74 for the execution of the "timer runout" sequence.

Although the computer program embodiment of the invention is disclosed in the form of a flow chart in FIGS. 3a, 3b and 3c, an individual skilled in the art of programming general purpose digital computers may, without exercising invention, reduce the program disclosed in these flow charts to the physical form of punched cards or magnetic tape for input to a general purpose digital computer.

It will be apparent to those skilled in the art that the disclosed method, apparatus and computer program for determining the transmission rate and coding configuration of remote terminals may be modified in numerous ways and may assume many embodiments other than the two preferred forms specifically set out and described above. For example, a timer may be provided in the hardware embodiment which will limit the length of time within which the initial characters transmitted from the remote terminal must be decoded as a valid character. The standard character transmitted by the remote terminal need not itself be a CARRIAGE RETURN (CR) character, although this is certainly a preferred and natural first character to be transmitted. It is obvious that any number of combinations of transmission rates and codes may characterize the remote terminals, although only five of the more frequently encountered Code-Bit-Rate combinations have been disclosed herein. Finally, the timing relationships existing between the incoming standard characters and the Signal Sampling Intervals shown in FIG. 4 may be so arranged as to avoid any ambiguous changes of state during the Signal Sampling Intervals and thereby eliminate the need for a backup test of the Second Character portion of the incoming standard character. Accordingly, it is intended by the appended claims to cover all such modifications of the invention which fall within the true spirit and scope of the invention.

What is claimed is:

1. In a data communication system wherein a computer is time-shared through a line adapter with a plurality of remote terminals, which remote terminals are configured to transmit and receive data having a variety of known bit rates and codes, a machine implemented method for determining the particular bit rate and code for which one remote terminal in said plurality of remote terminals is configured, said method comprising the steps of:

establishing electrical communication between said one remote terminal and said line adapter;

receiving a standard character transmitted from said one remote terminal to said line adapter;

decoding said standard character to determine for which of said variety of known bit rates and codes said one remote terminal is configured; and establishing data communication between said one remote terminal and said computer in response to the decoding of said standard character.

2. The method of claim 1 wherein said steps of decoding said standard character and establishing data communication together, include the steps of:

selectively timing the advance of said standard character into a first buffer at the highest of said known bit rates, parallel decoding said standard character advanced into said first buffer to determine which one of said variety of known bit rates and codes characterizes said standard character, selectively timing the advance of subsequent data characters into said first buffer at the bit rate found to characterize said standard character, and sequentially transferring said standard character and said subsequent data characters from said first buffer into a second buffer for examination by said computer.

3. In a data communication system wherein a computer is time-shared through a line adapter with a plurality of remote terminals, which remote terminals are configured to transmit and receive data having a variety of known bit rates and codes, a machine implemented method for determining the particular bit rate and code for which one remote terminal in said plurality of remote terminals is configured, said method comprising the steps of:

establishing electrical communication between said one remote terminal and said line adapter;

receiving a first character portion of a standard character transmitted from said one remote terminal to said line adapter;

decoding the first character portion of said standard character to initially determine for which of said variety of known bit rates and codes said one remote terminal is configured;

receiving a second character portion of said standard character transmitted from said one remote terminal to said line adapter;

decoding the second character portion of said standard character to positively determine for which of said variety of known bit rates and codes said one remote terminal is configured; and establishing data communication between said one remote terminal and said computer in response to the decoding of the first and second portions of said standard character.

4. In a data communication system wherein a computer is time-shared through a line adapter with a plurality of remote terminals, which remote terminals are configured to transmit and receive data having a variety of known bit rates and codes, a machine implemented method for determining the particular bit rate and code for which one remote terminal in said plurality of remote terminals is configured, said method comprising the steps of:

establishing electrical communication between said one remote terminal and said line adapter;

receiving a first character portion of a standard character transmitted from said one remote terminal to said line adapter;

selectively timing the advance of the first character portion of said standard character into a first buffer at the highest of said known bit rates;

parallel decoding the first character portion of said standard character advanced into said first buffer to determine which one of said variety of known bit rates and codes characterizes the first character portion of said standard character;

receiving a second character portion of said standard character transmitted from said one remote terminal to said line adapter;

selectively timing the advance of the second character portion of said standard character into said first buffer at the highest of said known bit rates;

parallel decoding the second character portion of said standard character advanced into said first buffer to determine which one of said variety of known bit rates and codes characterizes the second character portion of said standard character;

selectively timing the advance of subsequent data characters into said first buffer at the bit rate found to characterize both the first and second character portions of said standard character; and sequentially transferring the first and second character portions of said standard character and said subsequent data characters from said first buffer into a second buffer for examination by said computer.

5. In a data communication system wherein a computer is time-shared through a line adapter with a plurality of remote terminals, which remote terminals are configured to transmit and receive data having a variety of known bit rates and codes, apparatus for determining the particular bit rate and code for which one remote terminal in said plurality of remote terminals is configured, said apparatus comprising in combination:

means for establishing electrical communication between said one remote terminal and said line adapter;

means for receiving a standard character transmitted from said one remote terminal to said line adapter;

means for decoding said standard character to determine for which of said variety of known bit rates and codes said one remote terminal is configured; and means for establishing data communication between said one remote terminal and said computer in response to the decoding of said standard character.

6. The apparatus of claim 5 wherein said means for decoding and said means for establishing data communications include:

selective timing means for advancing said standard character into a first buffer at the highest of said known bit rates and for advancing any subsequent data characters into said first buffer at their characteristic bit rate, parallel decode means for determining which one of said variety of known bit rates and codes characterize the standard character advanced into said first buffer, synchronization means, responsive to said parallel decode means, for controlling at which of said of known bit rates said selective timing means will advance said data characters into said first buffer, and transfer means for sequentially parallel loading said standard character and said subsequent data characters from said first buffer into a second buffer for examination by said computer.

7. In a data communication system wherein a computer is time-shared through a line adapter with a plurality of remote terminals, which remote terminals are configured to transmit and receive data having a variety of known bit rates and codes, a method comprising the steps of:

detecting the presence of an electrical signal indicating that a one of said plurality of remote terminals is attempting to communicate with said computer;

configuring said line adapter to receive data characters at the highest of said known bit rates;

detecting the reception by said line adapter of a standard character transmitted from said one remote terminal;

decoding said standard character to determine for which of said variety of known bit rates and codes said one remote terminal is configured; and establishing data communication between said one remote terminal and said computer in response to the decoding of said standard character.

8. In a data communication system wherein a computer is time-shared through a line adapter with a plurality of remote terminals, which remote terminals are configured to transmit and receive data having a variety of known bit rates and codes, a method comprising the steps of:

detecting the presence of an electrical signal indicating that a one of said plurality of remote terminals is attempting to communicate with said computer;

configuring said line adapter to receive and transmit characters at the highest of said known bit rates;

detecting the reception by said line adapter of a first character portion of a standard character transmitted from said one remote terminal;

decoding a first character portion of said standard character to initially determine for which of said variety of known bit rates and codes said one remote terminal is configured;

detecting the reception by said line adapter of a second character portion of said standard character transmitted from said one remote terminal;

decoding the second character portion of said standard character to positively determine for which of said variety of known bit rates and codes said one remote terminal is configured; and establishing data communication between said one remote terminal and said computer in response to the decoding of the first and second character portions of said standard character.

9. The method of claim 8 including the additional step of:

terminating data communication between said one remote terminal and said computer upon the detection of a signal indicating that said one remote terminal has completed its communication with said computer.

10. The method of claim 8 wherein the establishing step includes the steps of:

configuring said line adapter to receive and transmit characters at the bit rate found to characterize said one remote terminal; and terminating data communication between said one remote terminal and said computer upon the detection of a signal indicating that said one remote terminal has completed its communication with said computer.

* * * * *